(12) United States Patent
Bremer et al.

(10) Patent No.: US 11,409,772 B2
(45) Date of Patent: Aug. 9, 2022

(54) ACTIVE LEARNING FOR DATA MATCHING

(71) Applicant: International Business Machines Corporation, Armonk, NY (US)

(72) Inventors: Lars Bremer, Boeblingen (DE);
Utkarsh Bajpai, Boeblingen (DE);
Martin Oberhofer, Sindelfingen (DE);
Alexandre Luz Xavier Da Costa, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/859,107

(22) Filed: Apr. 27, 2020

(65) Prior Publication Data

US 2021/0042330 A1 Feb. 11, 2021

(30) Foreign Application Priority Data

Aug. 5, 2019 (EP) ..................................... 19189991

(51) Int. Cl.
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
CPC .... G06F 16/285; G06N 20/00; G06N 3/0472; G06N 7/005
USPC ....................................................... 707/740
See application file for complete search history.

(56) References Cited

U.S. PATENT DOCUMENTS

| | | |
|---|---|---|
| 8,452,755 B1 | 5/2013 | Ye et al. |
| 8,799,282 B2 | 8/2014 | Goldenberg et al. |
| 9,311,301 B1 | 4/2016 | Balluru et al. |
| 10,467,201 B1 | 11/2019 | Merritt et al. |
| 10,558,627 B2 | 2/2020 | Cassidy et al. |

(Continued)

FOREIGN PATENT DOCUMENTS

| | | |
|---|---|---|
| CN | 102831222 B | 12/2012 |
| CN | 105740404 A | 7/2016 |

(Continued)

OTHER PUBLICATIONS

International Search Report and Written Opinion, International Application No. PCT/IB2020/057001, filed Jul. 24, 2020, 8 pgs.

(Continued)

*Primary Examiner* — Evan Aspinwall
(74) *Attorney, Agent, or Firm* — Kelli D. Morin

(57) ABSTRACT

A method includes training a machine learning model using a current set of labeled data points. Each of the data points is multiple data records. A label of a data point indicates a classification of the data point. The training results in a trained machine learning model configured to classify a data point as representing a same entity or different entities. The method includes selecting a subset of unlabeled data points from a current set of unlabeled data points using classification results of the current set of unlabeled data points. The method includes providing the subset of unlabeled data points to a classifier and in response to providing receiving labels of the subset of unlabeled data points. The method may be repeated using the subset of labeled data points in addition to the current set of labeled data points as the current set of labeled data points.

20 Claims, 5 Drawing Sheets

(56) References Cited

U.S. PATENT DOCUMENTS

| | | | |
|---|---|---|---|
| 10,685,293 B1* | 6/2020 | Heimann | H04L 63/1433 |
| 10,719,301 B1* | 7/2020 | Dasgupta | G06F 8/33 |
| 10,977,518 B1* | 4/2021 | Sharma | G06K 9/6223 |
| 2010/0010985 A1 | 1/2010 | Wong et al. | |
| 2015/0269494 A1 | 9/2015 | Kardes et al. | |
| 2017/0039486 A1* | 2/2017 | Simard | G06F 3/0482 |
| 2017/0075918 A1 | 3/2017 | Bates-Haus et al. | |
| 2017/0076342 A1 | 3/2017 | Golec et al. | |
| 2017/0123676 A1 | 5/2017 | Singhai et al. | |
| 2017/0278043 A1 | 9/2017 | Dow et al. | |
| 2017/0286443 A1 | 10/2017 | Ram | |
| 2018/0121535 A1 | 5/2018 | Oberhofer et al. | |
| 2018/0227190 A1 | 8/2018 | Healing et al. | |
| 2020/0202171 A1* | 6/2020 | Hughes | G06N 7/005 |

FOREIGN PATENT DOCUMENTS

| | | |
|---|---|---|
| CN | 105868773 A | 8/2016 |
| CN | 106777284 A | 5/2017 |

OTHER PUBLICATIONS

Papadakis et al., "A Blocking Framework for Entity Resolution in Highly Heterogeneous Information Spaces," IEEE Transactions on Knowledge and Data Engineering, vol. 25, No. 12, Dec. 2013, pp. 2665-2682.

Bremer et al., "Active Learning for Data Matching," Application No. eP19189991.3, filed Aug. 5, 2019.

Bremer et al., "Machine Learning Applied to the Clerical Task Management Problem in Master Data Management Systems," T. Grust et al. (Hrsg.): Datenbanksysteme für Business, Technologie und Web (BTW 2019), Lecture Notes in Informatics (LNI), Gesellschaft für Informatik, Bonn 2019 419, 13 pgs.

Khatibi, M., "Data Blocking in a Database System," U.S. Appl. No. 16/799,351, filed Feb. 24, 2020.

Khatibi, M., "Method for Data Blocking in a Database System", Application No. EP19189987.1, filed Aug. 5, 2019.

Kolb et al., "Block-based Load Balancing for Entity Resolution with MapReduce," dbs.uni-leipzig.de/file/pp0117-kolb.pdf, CIKM '11, Oct. 24-28, 2011, © 2011, ACM 978-1-4503-0717-8/11/10.

List of IBM Patents or Patent Applications Treated as Related, Apr. 22, 2020, 2 pgs.

Oberhofer et al., "Method for Dynamic Data Blocking in a Database System," Application No. EP19189996.2, filed Aug. 5, 2019.

Oberhofer, et al., "Method for Dynamic Data Blocking in a Database System," U.S. Appl. No. 16/841,255, filed Apr. 6, 2020.

Papadakis et al., "Comparative Analysis of Approximate Blocking Techniques for Entity Resolution," http://www.mi.parisdescartes.fr/~themisp/publications/pvldb16-blockingtechniques.pdf, 2016, 12 pgs.

Papadakis et al., "Eliminating the Redundancy in Blocking-based Entity Resolution Methods," http://disi.unitn.it/~themis/publications/jcdl11-ElimRedund.pdf, JCDL '11, Jun. 134-17, 2011, © 2011, ACM 978-1-4503-0744-4/11/06.

Papadakis et al., "Meta-Blocking: Taking Entity Resolution to the Next Level," http://www.mi.parisdescartes.fr/~themisp/publications/tkde13-metablocking.pdf, Mar. 27, 2013, 17 pgs.

Shao et al., "Active Blocking Scheme Learning for Entity Resolution," users.cecs.anu.edu.au/~u5170295/papers/pakdd-shao-2018.pdf, Research School of Computer Science, Australian National University, 12 pgs., accessed Oct. 11, 2019.

* cited by examiner

ACTIVE LEARNING FOR DATA MATCHING

BACKGROUND

The present invention relates to the field of digital computer systems, and more specifically, to a method for matching data.

Clerical records are records for which a given matching process cannot determine if they are duplicate records to each other and hence should be merged or if one or multiple should be considered a non-match and hence should be kept separate from each other. Those clerical records may need a user intervention for a closer look into the values of the data records. Despite the tremendous efforts to automate and improve the process of record matching, the number of those clerical records is continuously increasing (e.g. it can be millions of clerical records). This results in most of the clerical records being not processed for a very long time period during which inconsistent data may be used in system configurations.

SUMMARY

Various embodiments provide a method for matching data, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for matching data records of a dataset, the data records having values of a set of attributes. The method comprises:
- a) training a machine learning model using a current set of labeled data points, each of the data points being multiple data records, where a label of a data point indicates a classification of the data point, the training resulting in a trained machine learning model that is configured to classify a data point as representing a same entity or different entities;
- b) selecting from a current set of unlabeled data points a subset of unlabeled data points using classification results of classification of the current set of unlabeled data points using the trained machine learning model, the current set of unlabeled data points without the selected subset of unlabeled data points becoming the current set of unlabeled data points;
- c) providing to a classifier the subset of unlabeled data points and in response to the providing receiving labels of the subset of unlabeled data points;
- d) repeating steps a) to d) using the subset of labeled data points in addition to the current set of labeled data points as the current set of labeled data points;
- e) using the trained machine learning model to classify data points of the dataset.

In another aspect, the invention relates to a computer system for matching data records of a dataset, the data records having values of a set of attributes. The computer system is configured for:
- a) training a machine learning model using a current set of labeled data points, the data point being multiple data records, the training resulting in a trained machine learning model that is configured to classify a data point as representing a same entity or different entities;
- b) selecting from a current set of unlabeled data points a subset of unlabeled data points using classification results of the set of unlabeled data points by the trained machine learning model, the current set of unlabeled data points without the selected subset of unlabeled data points becoming the current set of unlabeled data points;
- c) providing to a classifier the subset of unlabeled data points and in response to the providing receiving labels of the subset of unlabeled data points;
- d) repeating steps a) to d) using the subset of labeled data points in addition to the current set of labeled data points as the current set of labeled data points;
- e) using the trained machine learning model to classify data points of the dataset.

In another aspect, the invention relates to an active learner for deduplication systems being configured for:
- a) training a machine learning model using a current set of labeled data points, the data point being multiple data records, the training resulting in a trained machine learning model that is configured to classify a data point as representing a same entity or different entities;
- b) selecting from a current set of unlabeled data points a subset of unlabeled data points using classification results of the set of unlabeled data points by the trained machine learning model, the current set of unlabeled data points without the selected subset of unlabeled data points becoming the current set of unlabeled data points;
- c) providing to a classifier the subset of unlabeled data points and in response to the providing receiving labels of the subset of unlabeled data points;
- d) repeating steps a) to d) using the subset of labeled data points in addition to the current set of labeled data points as the current set of labeled data points.

In another aspect, the invention relates to a computer program product comprising a computer-readable storage medium having computer-readable program code embodied therewith, the computer-readable program code configured to implement all of steps of the method according to preceding embodiments.

The method may enable an active learning in which the generation of training data is controlled within an iterative training process. The term "active learning" is used herein to refer to an active generation of training data by the present method in order to train the machine learning model. This may enable to find valuable and/or informative records and add these records iteratively to the training set. For example, for a given input data point, the trained machine learning model may output a classification result. The classification result comprises an indication of one or more classes in association with a probability that the input data point belongs to each of the one or more classes. For example, the higher the probability for class "same", the higher the level of matching between the records of the data point and vice versa. And, the higher the probability of a class "different" the lower the level of matching between the records of the data point and vice versa.

The present subject matter may be advantageous as it may enable an accurate classification of data points while saving processing resources by leveraging an active learning technique using less data for training. This may prevent using massive computational resources for the training on large data sets which may take days. The present method may use a subsetting of data that enables to identify valuable data for performing record matching.

For example, using the classification results, data points for which the classifications are most uncertain may be selected. For example, data points having a distribution of probabilities that follow a predefined structure may be selected. For that, the probabilities of unlabeled data points may be plotted and based on the distribution of the unlabeled data points a selection may be received e.g. from a user, of the selected subset of unlabeled data points. For example, if a data point class is known with a very high probability, this may indicate that the trained model has learned well the classification of this type of data points. Thus, by choosing most uncertain data points, the model may better be trained to learn new type of data.

BRIEF DESCRIPTION OF THE DRAWINGS

In the following embodiments of the invention are explained in greater detail, by way of example only, making reference to the drawings in which.

DETAILED DESCRIPTION

Figure 1:
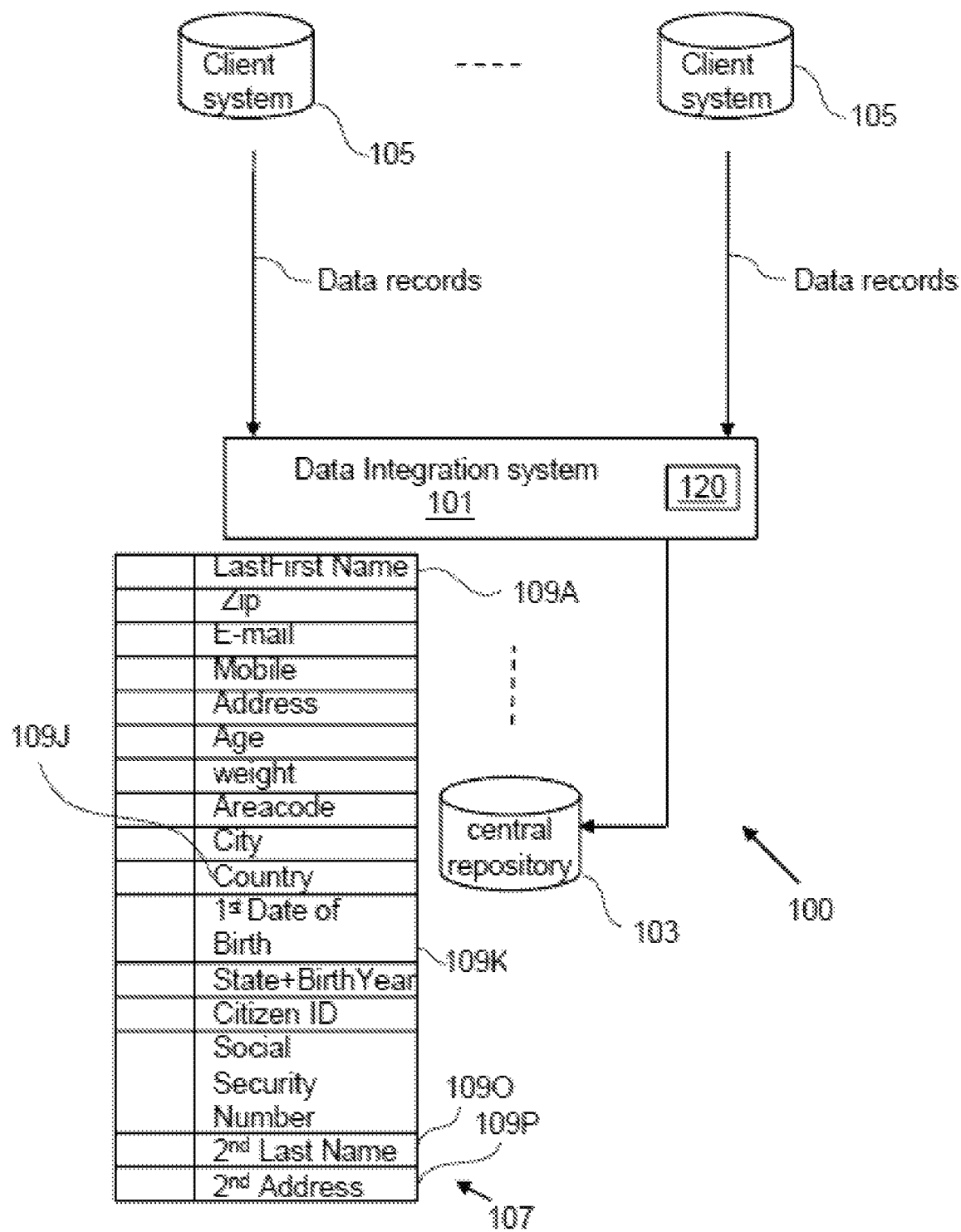
FIG. 1 depicts a block diagram representation of an exemplary computer system.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A dataset is a collection of one or more data records. For example, the dataset may be provided in the form of a collection of related records contained in a file e.g. the dataset may be a file containing records of all students in a class. The dataset may, for example, be a table of a database or a file of a Hadoop file system, etc. In another example, the dataset may comprise a document such as a HTML page or other document types. The document may, for example, comprise data of a patient.

A data record or record is a collection of related data items such as a name, date of birth and class of a particular user. A record represents an entity, wherein an entity refers to a user, object, or concept about which information is stored in the record. The terms "data record" and "record" are interchangeably used. The data records may be stored in a graph database as entities with relationships, where each record may be assigned to a node or vertex of the graph with properties being attribute values such as name, date of birth etc. The data records may, in another example, be records of a relational database.

The dataset may for example be received from one or more sources of data before being processed by the present method. The processed records may, for example, be stored in a central repository of the database system. The central repository may be a data store, storage, or database that stores data received from multiple client systems. Additionally, or alternatively, the dataset may comprise existing records of the computer system that are identified or selected in order to be processed by the present method. For example, a user selection of records of the dataset may be received. The records of the dataset may for example be pre-processed before being processed by the present method. The pre-processing may for example comprise transforming the format of the attribute values of the records of the dataset. For example, attribute values may be uppercased, their noise characters (such as - . / characters) may be removed. Anonymous attribute values (like a city=nowhere or first name=Test) may be removed and word mapping of attribute values may be performed to map a given attribute value to a corresponding predefined value (e.g. St. becomes Street after mapping St. to Street).

Matching of records comprises comparing attribute values of the records. Matched records (mergeable records) are records that represent the same entity. The level of matching of two records indicates the degree of similarity of the attribute values of the two records.

A data point refers to two or more records. The class of a data point may be "same" or "different" class, meaning that the records of the data point represent the same entity or different entities respectively. A labeled data point is a data point associated with a class (e.g. "same" or "different") that resulted from the classification of the data point. An unlabeled data point is an unclassified data point which is not associated with a class. The unclassified data points may comprise clerical records.

According to one embodiment, the method further comprises one of deduplication of the data records of the dataset using the classification of the data points of the dataset; merging or keeping separate data records of each data point of the dataset based on the classification of the data points of the dataset. The classification of the data points of the dataset is performed by the trained machine learning model.

For example, based on classes that have been assigned to each data point of the dataset it may be decided to deduplicate the data points that are classified as "same" meaning that they represent the same entity. In another example, the records of each data point that is of class "same" may be merged into one record e.g. a golden record. By classifying the records using the trained model, the present method may efficiently and reliably process the records of the dataset by deduplicating them or merging them. The processing may be efficient as it may prevent unnecessary deduplication operations that may result from an inaccurate classification of the records.

According to one embodiment, the method further comprises storing deduplicated data records of the dataset using the classification of the data points of the dataset. The classification of the data points of the dataset is performed by the trained machine learning model. This embodiment may save processing resources such as storage resources by avoiding to store unnecessary data while the data content may be the same after deduplication or merging of records.

According to one embodiment, the trained machine learning model used in step e) is the trained machine learning model that results from a number of iterations of steps a)-d).

For example, the number of iterations may be a user predefined number e.g. 2 or 3 iterations. In another example, the number of iterations may automatically be chosen e.g. randomly. In another example, upon receiving a request to perform step e), the trained model that resulted from the last iteration that preceded the received request may be used for step e).

This embodiment may enable to use the trained machine learning model while performing the training of the model. This may enable an efficient process of training and inference of the trained model.

According to one embodiment, the repeating is performed for a predefined number of iterations or until the set of unlabeled data points comprises a number of data points that is smaller than a predefined minimum number.

This embodiment may enable a controlled and automatic process of training the machine learning model.

According to one embodiment, step d) comprises in response to determining that the set of unlabeled data points comprises a number of data points that is smaller than a predefined minimum number, waiting until the set of unlabeled data points comprises a number of data points that is higher than or equal to the predefined minimum number for the repeating of steps a) to d).

This embodiment may particularly be advantageous in large systems such as MDM systems where data records are almost continuously entering the system. In this case, a continuous iterative execution of the training may be advantageous as the trained model gets improved while more data is used. Improved trained model means accurate classification results which may enable to obtain reliable record processing results.

According to one embodiment, the method further comprises receiving further unlabeled data points, wherein the current set of unlabeled data points in addition to the received further unlabeled data points becomes the current set of unlabeled data points. This embodiment may further improve the trained machine learning model by using more data.

According to one embodiment, the selecting of the subset of unlabeled data points further comprises: selecting from the current set of unlabeled data points an intermediate subset of unlabeled data points using the classification results, clustering the data points of the intermediate subset of unlabeled data points using a first subset of attributes of the set of attributes, resulting in multiple clusters; for each cluster of the multiple clusters identifying a closest data point to the centroid of the cluster, wherein the subset of unlabeled data points comprises the identified closest data points.

The clustering enables to discover groups of similar examples within the intermediate subset of unlabeled data points. For example, more than one data point per cluster may not significantly improve the training of the model and using the centroid may be advantageous as it may be a reliable representation of the clusters. In addition, selecting the points closest to the centroids of multiple clusters may enable to find very different points. This may help machine learning to train a better model. These clustered points may be prioritized for in order to be labeled by the data stewards.

The selection may for example be performed using a sampling function. Using the sampling function, the current set of unlabeled data points may be ranked. The intermediate subset of unlabeled data points comprises first X ranked data points. The ranking may be performed according to the importance and how beneficial the data points will be to the current trained learning model to increase its accuracy. The clustering may be performed using all data points of the intermediate subset of data points. In another example, the clustering may be performed separately for data points that have the same rank in the intermediate subset.

According to one embodiment, the selecting of the subset of unlabeled data points further comprises: ranking the data points of the current set of unlabeled data points using the classification results, clustering the data points of the current set of unlabeled data points using a first subset of attributes of the set of attributes, resulting in multiple clusters; for each cluster of the multiple clusters identifying a closest data point to the centroid of the cluster, wherein the subset of unlabeled data points comprises the identified closest data points, wherein the clustering is separately performed for data points that have the same rank in the current set of unlabeled data points.

There can be multiple data points of the current set of unlabeled data points with the same rank e.g. all these points are equally beneficial for the current model and a selection of the intermediate subset out of these may become a challenge. In this example, there may be no need to provide the intermediate subset and the clustering may be performed on data points that have the same rank in the current set of unlabeled data points. This may enable to obtain the selected data points to be further used for the training.

According to one embodiment, the selecting of the subset of unlabeled data points further comprises: selecting from the current set of unlabeled data points a first intermediate subset of unlabeled data points using the classification results, selecting from the first intermediate subset of unlabeled data points a second intermediate subset of unlabeled data points using a metadata parameter descriptive of the data points, clustering the data points of the second intermediate subset of unlabeled data points using a first subset of attributes of the set of attributes, resulting in multiple clusters; for each cluster of the multiple clusters identifying a closest data point to the centroid of the cluster, wherein the subset of unlabeled data points comprises the identified data points.

According to one embodiment, the selecting of the subset of unlabeled data points further comprises: ranking the data points of the current set of unlabeled data points using the classification results, further ranking the data points that have same rank using a metadata parameter descriptive of the data points, the ranking and the further ranking resulting in a ranked current set of unlabeled data points, clustering the data points of the current set of unlabeled data points using a first subset of attributes of the set of attributes, resulting in multiple clusters; wherein the clustering is separately performed for data points that have the same rank in the current set of unlabeled data points, for each cluster of the multiple clusters identifying a closest data point to the centroid of the cluster, wherein the subset of unlabeled data points comprises the identified closest data points.

According to one embodiment, the selecting of the subset of unlabeled data points further comprises: selecting from the current set of unlabeled data points an intermediate subset of unlabeled data points using the classification results, selecting from the intermediate subset of unlabeled data points the subset of unlabeled data points using a metadata parameter descriptive of the data points.

According to one embodiment, the selecting of the subset of unlabeled data points further comprises: ranking the data points of the current set of unlabeled data points using the classification results, further ranking the data points that have same rank using a metadata parameter descriptive of the data points, the ranking and the further ranking resulting in a ranked current set of unlabeled data points, wherein the subset of unlabeled data points comprises data points having the first K ranks, where K is a predefined number.

The ranking may be performed using one of a random sampling method; margin sampling method; entropy sampling method and disagreement sampling method.

These embodiments may enable a multi-layer selection process in which different types of selections are combined in order to obtain a most valuable subset of records for further training the machine learning model. Each of the three selections is based on a different criterion. For example, the first selection is based on the classification results of the records, the second selection is based on the distribution of the records in a multidimensional space of attribute values, and the third selection is based on preferred user records.

According to one embodiment, the metadata parameter comprises at least one of: a last modification time of the data point; and a user priority value of the data point.

According to one embodiment, the method further comprises clustering received data points using a second subset of attributes of the set of attributes, resulting in multiple clusters; for each cluster of the multiple clusters identifying a closest data point to the centroid of the cluster, wherein the set of unlabeled data points comprises the identified data points. This may further improve the training process and may increase the accuracy of the predictions made by the trained model.

According to one embodiment, the second subset of attributes is the same or different from the first subset of attributes.

According to one embodiment, the first subset of attributes is part of attributes of the second subset of attributes.

According to one embodiment, receiving the labels of the subset of unlabeled data points further comprises receiving an indication of the first subset of attributes.

According to one embodiment, the selection is performed using one of the random sampling method; margin sampling method; entropy sampling method and disagreement sampling method. In one example, for each current iteration of the method, a sampling method that is different from the sampling method used in a last iteration may be used. For example, if the method is repeated 2 times, in the first execution the random sampling method may be used for the selecting step, the first iteration may use the margin sampling method for the selecting step and the second iteration may use disagreement sampling method for the selecting step.

According to one embodiment, the selecting comprises ranking the current set of unlabeled data points and selecting the first K ranked data points. For example, the data points may be ranked in ascending order of the difference probabilities and the first K ranked data points may be selected. K may be a predefined number e.g. 10. The difference probability of a data point is the difference between the probability that the data point is of class "same" and the probability that the data point is of class "different".

FIG. 1 depicts an exemplary computer system 100. The computer system 100 may, for example, be configured to perform master data management and/or data warehousing e.g. the computer system 100 may enable a de-duplication system. The computer system 100 comprises a data integration system 101 and one or more client systems or data sources 105A-N (collectively referred to as 105). The client system 105 may comprise a computer system (e.g. as described with reference to FIG. 5). The data integration system 101 may control access (read and write accesses etc.) to a central repository 103. The storage system may comprise the central repository 103.

Data integration system 101 may process records received from client systems 105 and store the data records into central repository 103. The client systems 105 may communicate with the data integration system 101 via a network connection which comprises, for example, a wireless local area network (WLAN) connection, WAN (Wide Area Network) connection LAN (Local Area Network) connection or a combination thereof.

The data records stored in the central repository 103 may have a predefined data structure 107 such as a data table with multiple columns and rows. The predefined data structure may comprise a set of attributes 109A-P (e.g. each attribute representing a column of the data table 107). In another example, the data records may be stored in a graph database as entities with relationships. The predefined data structure may comprise a graph structure where each record may be assigned to a node of the graph. Although the present example is described in terms of few attributes, more or less attributes may be used. The set of attributes 109A-P may, for example, be dynamically updated or determined while receiving data records e.g. if a received data record has a new attribute that is not part of set of attributes 109A-P, that new attribute may be added to the set of attributes 109A-P. In another example, the set of attributes 109A-P may be determined based on historical data indicating all attributes that are used by client systems 105.

For example, the client systems 105 may be configured to provide or create data records which may or may not have the same data structure 107. The attributes of each record received from the client systems 105 may be all the attributes 109A-P or part of the attributes 109A-P. For example, a client system 105 may be configured to provide records in XML or JSON format or other formats that enable to associate attributes and corresponding attribute values, wherein at least part of the attributes 109A-P are associated in the XML with respective values.

Each client system 105 may be configured to send the created data records to the data integration system 101 in order to be stored on the central repository 103 after being processed in accordance with an example method of the present disclosure. Before being processed, the received record may be transformed e.g. by the data integration system 101, into a format of the data structure 107.

In one example, data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

Each data record received from client systems 105 by the data integration system 101 may or may not have all values of the set of attributes 109A-P e.g. a data record may have values of a subset of attributes of the set of attributes and may not have values for the remaining attributes. Once stored in the repository 103, the remaining attributes having no values may be maintained empty in one example. In other terms, the records provided by the client systems 105 have different completeness. The completeness is the ratio of number of attributes of a data record comprising data values to a total number of attributes in the set of attributes 109A-P.

The data integration system 101 may be configured to process the received records using one or more algorithms such as an algorithm 120 implementing at least part of the present method. For example, the data integration system 101 may process the data records received from the client systems 105 using the algorithm 120 in order to find pairs of records that represent the same entity or duplicate records in accordance with the present disclosure.

Figure 2:
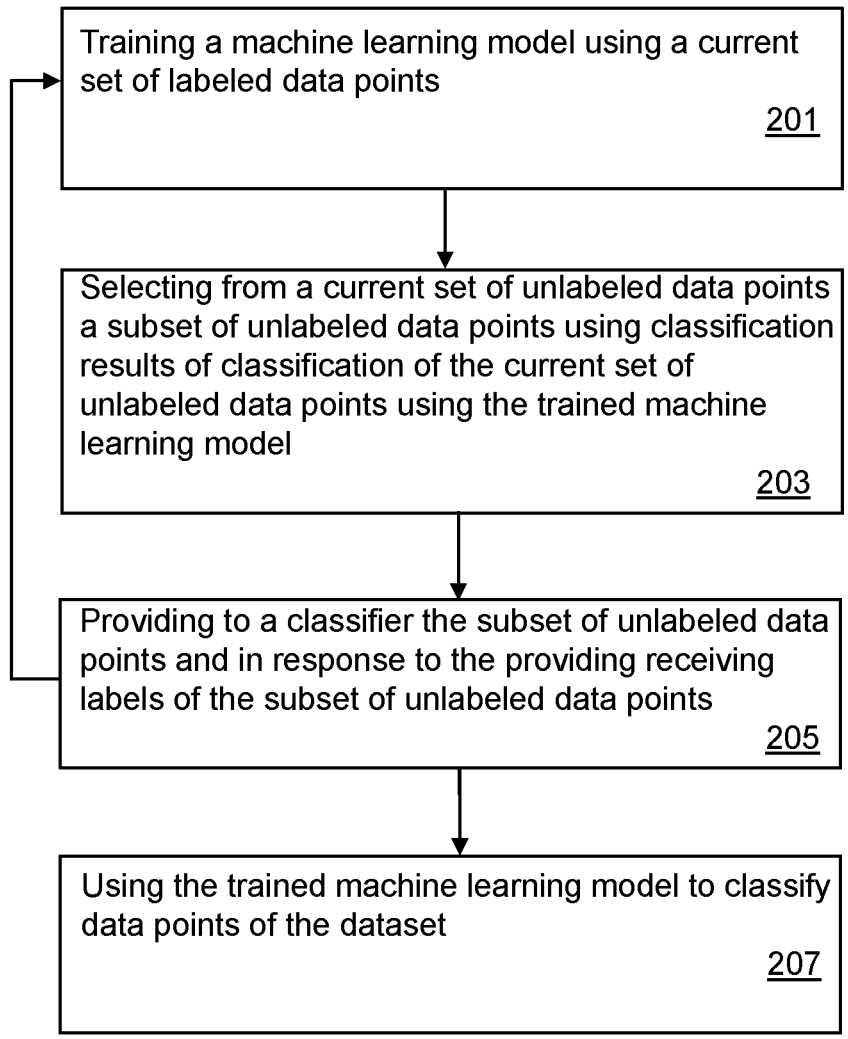
FIG. 2 is a flowchart of a method for matching data records of a dataset in accordance with an example of the present disclosure.

FIG. 2 is a flowchart of a method for matching data records of a dataset. The data records have values of a set of attributes. For simplification purpose, the method of FIG. 2 will be described with reference to FIG. 1 but it is not limited to.

The matching of records comprises comparing attribute values of the records. Matched records are records that represent the same entity (same person) and records which are different may be of different entities. The level of matching of two records indicates the degree of similarity of the attribute values of the two records. The records that are matched or compared may for a single data point. That is a data point as used herein refers to the records that are to be matched or compared against each other to determine if they represent the same entity or represent different entities. The dataset may comprise multiple data points.

The dataset may comprise data records. The dataset may for example be received from one or more of the client systems 105 at the data integration system 101. In another example, the dataset may be an existing dataset, of one or more databases such as the central repository that is to be classified in accordance with the present subject matter.

The data records of the dataset may, for example, have at least part of the attributes 109A-P. The data records of the dataset may or may not have the data structure 107. In case the received data records have a structure different from the predefined structure 107, a transformation process may be executed in order to transform the structure of the records of the dataset to the data structure 107.

In order to classify the data points of the dataset in an optimal way, an active learning may be used as described herein by at least part of steps of 201-205.

A machine learning model may be trained in step 201 using a current set of labeled data points. Each data point of the current set of labeled data points may be associated with a respective label indicating whether the data point belongs to a same entity or to different entities. For example, the label may have two values "same" or different". The label thus indicates the classification of the data point to which it is associated. Step 201 may result in a trained machine learning model that is configured to classify a data point as representing a same entity or different entities. For example, by inputting a data point to the trained machine learning model, the trained machine learning model may output a classification result indicating the classification of the input data point. The classification result may further comprise a probability value indicating how likely the input data point is to be classified into a certain class of "same" and "different".

The present method may be advantageous as the current set of labeled data points which is used in the first execution of step 201 may comprise few or a small number of data points and still be useful for the classification of the dataset. This may be enabled by the fact that the number of data points in the current set of labeled data points may progressively be increased by the present method as described herein and for each new or updated current set of labeled data points the classification by the trained machine learning model may get improved.

In one example, the machine learning model may be a Random Forest.

In step 203, a subset of unlabeled (or unclassified) data points may be selected from a current set of unlabeled data points. The selection of the subset of unlabeled data points may be performed using classification results of classification of the current set of unlabeled data points using the trained machine learning model. The classification of the current set of unlabeled data points may for example be performed by inputting the current set of unlabeled data points to the trained machine learning model. In response to inputting the current set of unlabeled data points to the trained machine learning model the classification results of the current set of unlabeled data points may be received. For example, for each input data point of the current set of unlabeled data points, a classification result of the input data point may be received.

The selection of step 203 is performed based on how beneficial the unclassified data points are to the trained machine learning model. For example, using the classification results, data points for which the classifications are most uncertain may be selected. For example, data points having a distribution of probabilities that follow a predefined structure may be selected. For that, the probabilities of unlabeled points may be plotted and based on the distribution of the data points they may or may not be selected. For example, if a data point class is known with a very high probability, this may indicate the trained model has learned well the classification of this type of data points. Thus, by choosing most uncertain data points, the model may be better trained and thus the trained model may be accurate. For example, the most uncertain data points that are obtained by the margin sampling method may be more beneficial for the training than other data points.

In one example, the selection of the subset of unlabeled data points may be performed using a random sampling method. For example, among the classification results of the current set of unlabeled data points, a subset of classification results may be selected randomly. This selected subset of classification results comprises classification results of particular unlabeled data points of the current set of unlabeled data points. The particular unlabeled data points may be the selected subset of unlabeled data points.

In another example, the selection of the subset of unlabeled data points may be performed using a margin sampling method. The margin sampling method may use the probability values of the classification results of the current set of unlabeled data points. Those probability values are used to select the most uncertain data points based on the same/similar probability of the data point being classified into any class. For example, using the margin sampling method the data points may be ranked so that their rank reflects the uncertainty of the classification. The subset of unlabeled data point are the N most uncertain data points. If for example, same data points are of the same rank they are counted in the selected N data points e.g. if N=4, and the ranking indicates that 3 data points have the same rank 1, one data point has rank 2 and 5 data points have rank 3, the 4 selected first uncertain data points are the 3 data points that have the same rank 1 in addition to one that has the rank 2.

In another example, the selection of the subset of unlabeled data points may be performed by prompting a user with the classification results of the current set of unlabeled data points and requesting for a selection to be performed. In response to the prompting, data or information indicative of the subset of unlabeled data points may be received. For example, the user may perform an analysis of the distribution of the probability values in order to decide which subset to select.

After selecting the subset of unlabeled data points, the current set of unlabeled data points may be updated by excluding or removing from it the selected subset of unlabeled data points. This may result in the current set of unlabeled data points having a reduced number of records.

In step 205, a classifier may be provided with the subset of unlabeled data points and in response to the providing labels of the subset of unlabeled data points may be received. For example, a steward (the classifier is the steward) may be requested or queried to perform a classification, based on his or her experience, of the subset of unlabeled data points. For example, for each data point of the subset of unlabeled data points the steward may compare the attribute values of the records of the data point. The results of his or her comparison may be received.

Thus, using steps 203 and 205, further labeled data points are obtained by the present method. This may enable to increase or enhance the current set of labeled data points. For example, the subset of labeled data points may be added to the current set of labeled data points to form the current set of labeled data points for a next iteration of the present method. The current set of labeled data points may be used to repeat steps 201-205. The trained machine learning model that results from a last iteration may be used, in each current iteration of steps 201-205.

In one example, the repetition of steps 201-205 for each current set of unlabeled data points may be performed for a predefined number of iterations or until the set of unlabeled data points comprises a number of data points that is smaller than a predefined minimum number.

In another example, in response to determining that the set of unlabeled data points comprises a number of data points that is smaller than a predefined minimum number, once may wait until the set of unlabeled data points comprises a number of data points that is higher than or equal to the predefined minimum number for repeating of steps 201-205.

The trained machine learning model may be used in step 207 to classify all data points of the dataset. The trained machine learning model used in step 207 may be the trained machine learning model that results from a predefined number of iterations of steps 201-205. For example, once the user is confident that model has been trained sufficiently, he or she may decide to use the trained machine learning model. The usage of the trained machine learning model may not affect or interrupt the active learning process enabled by the iterations of steps 201-205.

The classification of the data points of the dataset may enable to perform an entity Resolution (ER). The ER is the process for identifying the same real-world data across the classified data points of the dataset, by using the classes that have been assigned to the data points of the dataset.

Figure 3:
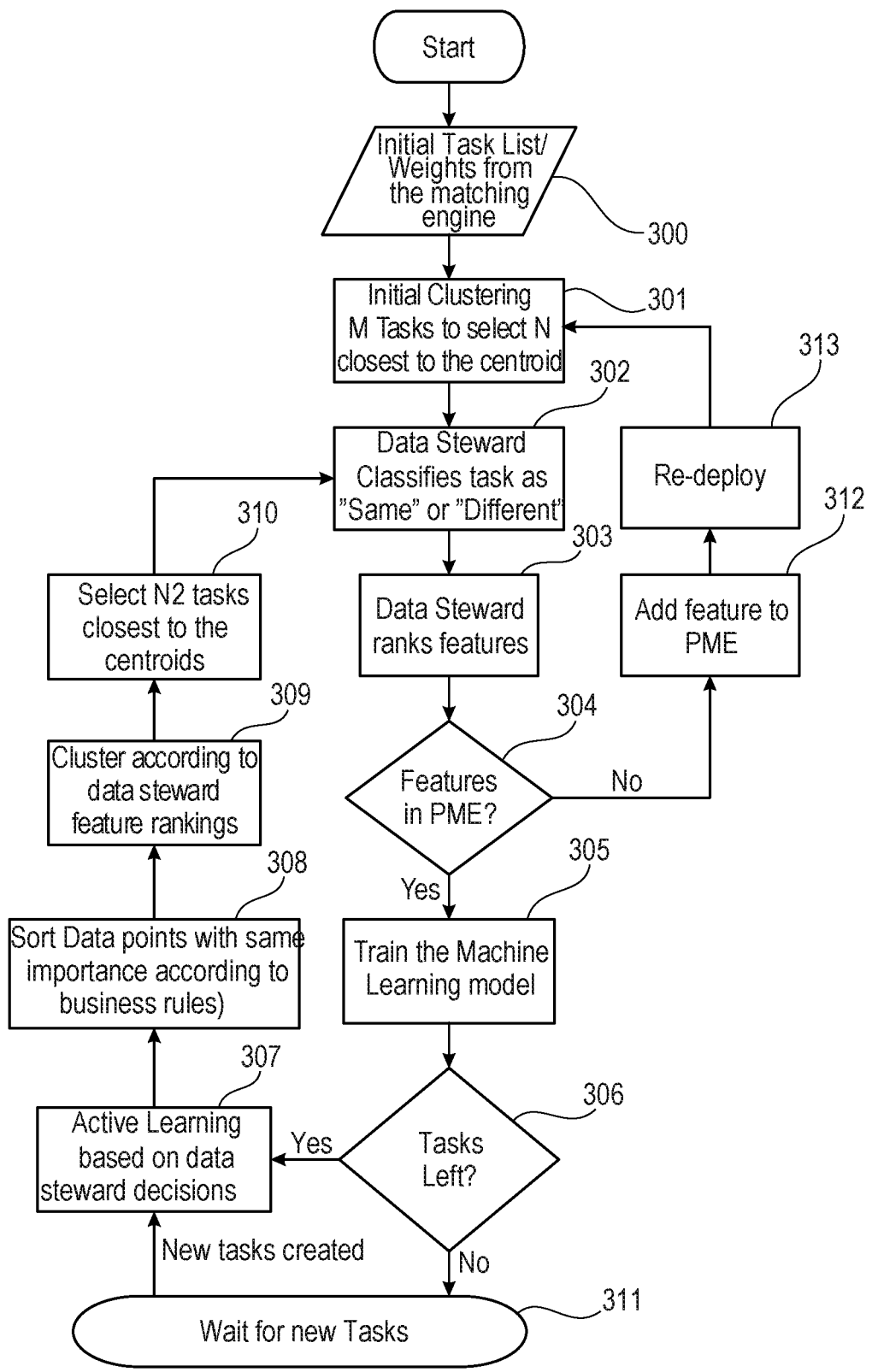
FIG. 3 is a flowchart of a method for an active learning of subsets for training a machine learning model.
Figure 4:
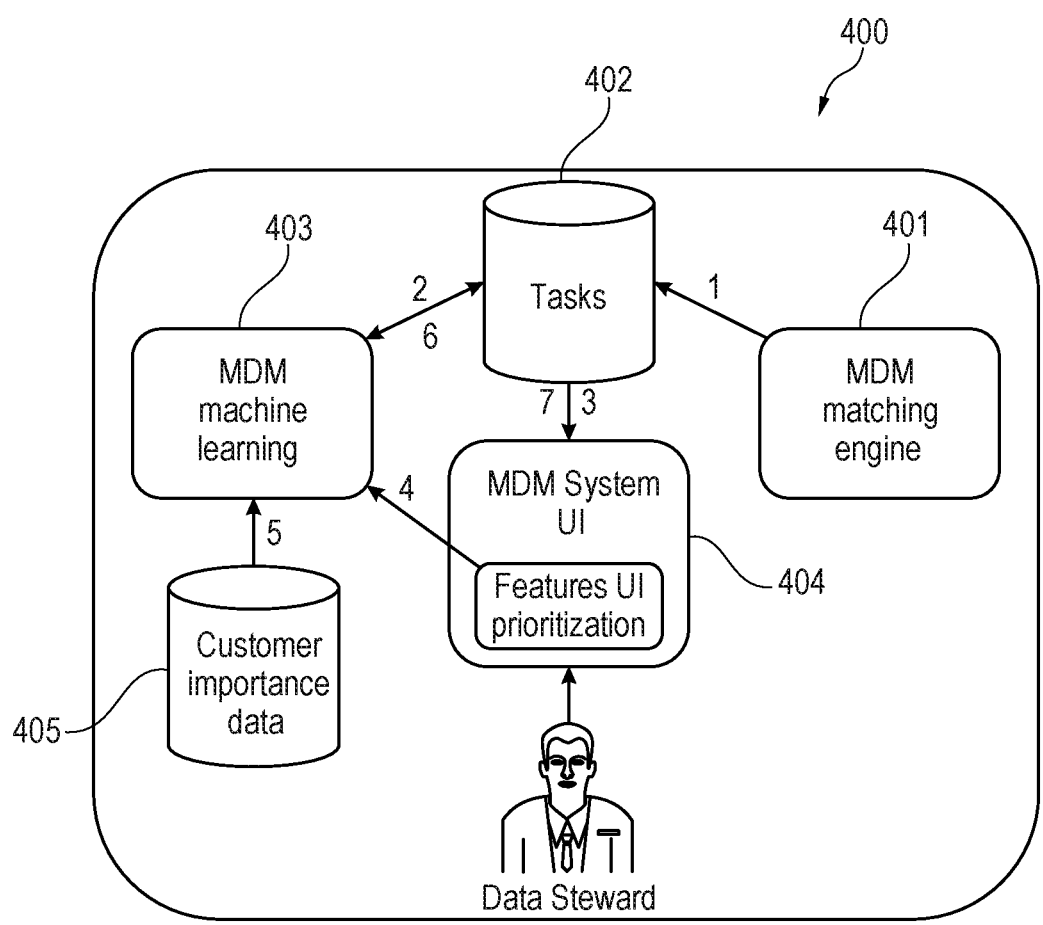
FIG. 4 depicts a block diagram representation of an exemplary computer system.

FIG. 3 is a flowchart of a method for an active learning of subsets for training a machine learning model. FIG. 3 will be described with reference to the computer system 400 of FIG. 4 for simplification of the description.

In step 300, an initial task list may be received from a matching engine 401. The initial task list may for example be stored in a task database 402. The matching engine may for example be a probabilistic matching engine (PME). The initial task list comprises M tasks, wherein each task of the M tasks is associated with a data point. The data point comprises records, and the task of the data point may require the matching of the records of the data point. Thus, hereinafter, the terms data point and task are interchangeably used. The records may have a set of attributes. The records of the initial task may be obtained by the PME engine by suing PME attributes which are part of the set of attributes.

In step 301, an initial clustering of the M Tasks to select N tasks closest to the centroid may be performed. For that, the M tasks may be clustered using a first subset of attributes of the set of attributes. This may result in multiple clusters. For each cluster of the multiple clusters a closest task to the centroid of the cluster may be identified. This results in the N tasks. The clustering may for example be performed by a machine learning component 403 of the computer system 400.

In step 302, the data steward classifies the N tasks with the class "same" or "different". For example, upon selecting the N tasks, the steward is requested or prompted to perform steps 302 and 303 using a user interface (UI) 404.

In step 303, the data steward ranks the set of attributes. The results of steps 302 and 303 may for example be received at the machine learning component 403 via the UI 404.

In inquiry step 304, it may be determined if the ranked attributes are used for obtaining the initial task by the PME engine. If so, steps 305-310 may be performed, otherwise steps 312-313 may be performed.

In step 305, the machine learning model may be trained using at least the N classified tasks. In one example, an initial training set comprising K tasks may be used. In this case in step 305, the initial training set may be increased by the N tasks and the training may be performed using the N+K tasks.

It may be determined (inquiry step 306) if tasks remain after selecting the N tasks in the initial list e.g. it may be determined if M-N is not zero.

If tasks remain, an active learning may be performed in step 307 based on the data steward decisions using the M-N tasks. This may result in L tasks where L<=M-N. For example, a ranking of the M-N tasks may be based on sampling functions. The sampling functions may for example include Random Sampling, Entropy Sampling, Margin Sampling and Disagreement Sampling but it is not limited to.

In addition, in step 308, the L tasks may further be sorted using business rules that indicate which data is to be selected. And a selection may be performed resulting in H tasks, where H<L. This step may for example be performed using the customer importance database 405. For example, after the ranking of step 307 by sampling methods, multiple data points can have similar ranks. Then the business rules are used to further select the data points. In this case, the customer data may be used for better selection of tasks that are more beneficial to a user.

In step 309 and 310, the H tasks may be clustered as described with step 301, but using the ranked attributes and N2 tasks may be selected accordingly. These N2 tasks may be provided back to the data steward for another iteration of steps 302-310.

If (inquiry step 306) there are no tasks left, new tasks may be waited for in step 311 before going to steps 307 to 310.

In step 312, the ranked attributes which are not used by the PME engines may be added to the PME attributes and a redeployment may be performed in step 313 in order to generate a new initial sample from which the N tasks may be selected using the clustering. Steps 304 to 310 may be performed by the machine learning component 403.

Figure 5:
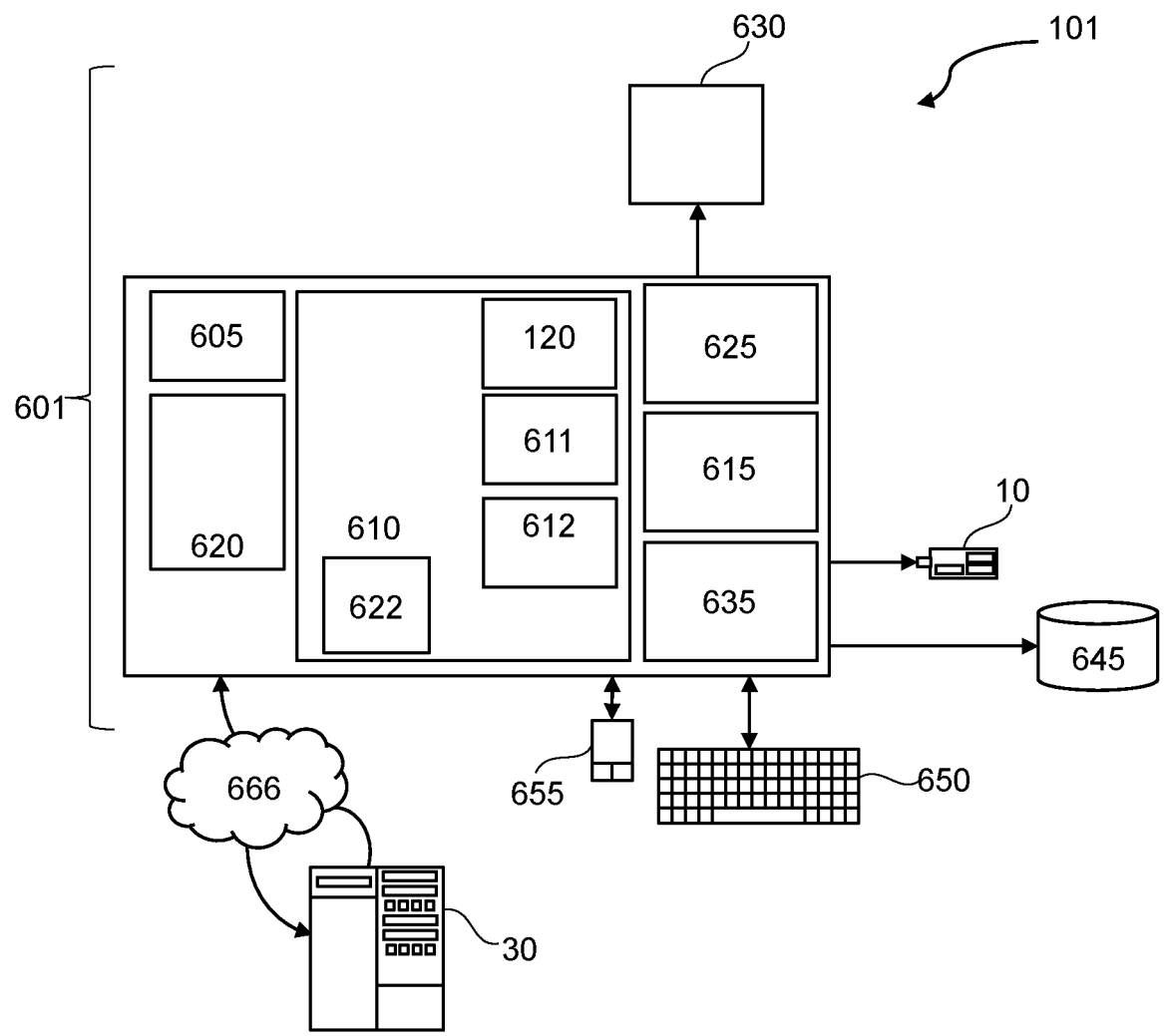
FIG. 5 represents a computerized system, suited for implementing one or more method steps as involved in the present disclosure.

FIG. 5 depicts an example hardware implementation of data integration system 101. FIG. 5 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs, such as the algorithm 120. The algorithm 120 may, for example, comprise a database management system or a Java application. The algorithm 120 may comprise components for performing at least part of the present method. The algorithm 120 may further comprise a component for performing standardization of data records e.g. before performing the matching. The standardization refers to a process of transforming data to a predefined data format. The data format may include a common data definition, format, representation and structure. The data that is to be transformed is the data that is not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 101 can further include a display controller 625 coupled to a display 630. In exemplary embodiments, the system 101 can further include a network interface for coupling to a network 666. The network 666 can be an IP-based network for communication between the computer 601 and any external server, client and the like via a broadband connection. The network 666 transmits and receives data between the computer 601 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software, as is shown in FIG. 5, the methods can be stored on any computer readable medium, such as storage 620, for use by or in connection with any computer related system or method. The storage 620 may comprise a disk storage such as HDD storage.

Various embodiments are specified in the following numbered clauses:

1. A method for matching data records of a dataset, the data records having values of a set of attributes, comprising:
   a) training a machine learning model using a current set of labeled data points, each of the data points being multiple data records, wherein a label of a data point indicates a classification of the data point, the training resulting in a trained machine learning model that is configured to classify a data point as representing a same entity or different entities;
   b) selecting from a current set of unlabeled data points a subset of unlabeled data points using classification results of classification of the current set of unlabeled data points using the trained machine learning model, the current set of unlabeled data points without the selected subset of unlabeled data points becoming the current set of unlabeled data points;
   c) providing to a classifier the subset of unlabeled data points and in response to the providing receiving labels of the subset of unlabeled data points;
   d) repeating steps a) to d) using the subset of labeled data points in addition to the current set of labeled data points as the current set of labeled data points;
   e) using the trained machine learning model to classify data points of the dataset.

2. The method of clause 1, further comprising one of: deduplication of the data records of the dataset using the classification of the data points of the dataset by the trained machine learning model;
merging or keeping separate data records of each data point of the dataset based on the classification of the data points of the dataset by the trained machine learning model.

3. The method of clause 1, further comprising storing deduplicated data records of the dataset using the classification of the data points of the dataset by the trained machine learning model.

4. The method of clause 1, wherein the trained machine learning model used in step e) is the trained machine learning model that results from a predefined number of iterations of steps a)-d).

5. The method of clause 1, wherein the repeating is performed for a predefined number of iterations or until the set of unlabeled data points comprises a number of data points that is smaller than a predefined minimum number.

6. The method of clause 1, wherein step d) comprises in response to determining that the set of unlabeled data points comprises a number of data points that is smaller than a predefined minimum number, waiting until the set of unlabeled data points comprises a number of data points that is higher than or equal to the predefined minimum number for the repeating of steps a) to d).

7. The method of clause 1, further comprising receiving further unlabeled data points, wherein the current set of unlabeled data points in addition to the received further unlabeled data points becomes the current set of unlabeled data points.

8. The method of clause 1, wherein the selecting of the subset of unlabeled data points further comprises: selecting from the current set of unlabeled data points an intermediate subset of unlabeled data points using the classification results, clustering the data points of the intermediate subset of unlabeled data points using a first subset of attributes of the set of attributes, resulting in multiple clusters; for each cluster of the multiple clusters identifying a closest data point to the centroid of the cluster, wherein the subset of unlabeled data points comprises the identified closest data points.

9. The method of clause 1, wherein the selecting of the subset of unlabeled data points further comprises: selecting from the current set of unlabeled data points a first intermediate subset of unlabeled data points using the classification results, selecting from the first intermediate subset of unlabeled data points a second intermediate subset of unlabeled data points using a metadata parameter descriptive of the data points, clustering the data points of the second intermediate subset of unlabeled data points using a first subset of attributes of the set of attributes, resulting in multiple clusters; for each cluster of the multiple clusters identifying a closest data point to the centroid of the cluster, wherein the subset of unlabeled data points comprises the identified data points.

10. The method of clause 1, wherein the selecting of the subset of unlabeled data points further comprises: selecting from the current set of unlabeled data points an intermediate subset of unlabeled data points using the classification results, selecting from the intermediate subset of unlabeled data points the subset of unlabeled data points using a metadata parameter descriptive of the data points.

11. The method of clause 9, the metadata parameter comprising at least one of: a last modification time of the data point; a user priority value of the data point.

12. The method of clause 1, further comprising clustering received data points using a second subset of attributes of the set of attributes, resulting in multiple clusters; for each cluster of the multiple clusters identifying a closest data point to the centroid of the cluster, wherein the set of unlabeled data points comprises the identified data points.

13. The method of clause 12, wherein the second subset of attributes is the same or different from the first subset of attributes.

14. The method of clause 12, the first subset of attributes is part of attributes of the second subset of attributes.

15. The method of clause 8, wherein receiving the labels of the subset of unlabeled data points further comprises receiving an indication of the first subset of attributes.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for matching data records of a dataset, the data records having values of a set of attributes, the method comprising:

training a machine learning model using a current set of labeled data points, each of the data points being multiple data records, wherein a label of a data point indicates a classification of the data point, the training resulting in a trained machine learning model that is configured to classify a data point as representing a same entity or different entities;

selecting from a current set of unlabeled data points a subset of unlabeled data points using classification results of classification of the current set of unlabeled data points using the trained machine learning model, the current set of unlabeled data points without the selected subset of unlabeled data points becoming the current set of unlabeled data points;

providing to a classifier the subset of unlabeled data points and in response to the providing, receiving labels of the subset of unlabeled data points;

repeating training, selecting, and providing using the subset of labeled data points in addition to the current set of labeled data points as the current set of labeled data points; and using the trained machine learning model to classify data points of the dataset, wherein:

training the machine learning model includes comparing a first set of attributes ranked by the classifier to a second set of attributes used by a probabilistic matching engine to train the machine learning model, in response to determining that the first set of attributes includes attributes not included in the second set of attributes, adding such attributes of the first set of attributes to the second set of attributes, and in response to determining that the second set of attributes includes all attributes included in the first set of attributes, using an initial training set of data points.

2. The method of claim 1, further comprising one of:

deduplicating the data records of the dataset using the classification of the data points of the dataset by the trained machine learning model; and one of merging and keeping separate data records of each data point of the dataset based on the classification of the data points of the dataset by the trained machine learning model.

3. The method of claim 2, further comprising:

storing deduplicated data records of the dataset using the classification of the data points of the dataset by the trained machine learning model.

4. The method of claim 1, wherein:

the trained machine learning model that is used to classify data points of the dataset is the trained machine learning model that results from a predefined number of iterations of training, selecting, and providing.

5. The method of claim 1, wherein repeating training, selecting, and providing is performed one of:

for a predefined number of iterations; and until the set of unlabeled data points comprises a number of data points that is smaller than a predefined minimum number.

6. The method of claim 5, wherein repeating training, selecting, and providing comprises:

in response to determining that the set of unlabeled data points comprises a number of data points that is smaller than a predefined minimum number, waiting until the set of unlabeled data points comprises a number of data points that is higher than or equal to the predefined minimum number for the repeating.

7. The method of claim 1, further comprising:

receiving further unlabeled data points, wherein the current set of unlabeled data points in addition to the received further unlabeled data points becomes the current set of unlabeled data points.

8. The method of claim 1, wherein selecting the subset of unlabeled data points further comprises:

selecting from the current set of unlabeled data points an intermediate subset of unlabeled data points using the classification results;

clustering the data points of the intermediate subset of unlabeled data points using a first subset of attributes of the set of attributes, resulting in multiple clusters; and for each cluster of the multiple clusters identifying a closest data point to the centroid of the cluster, wherein the subset of unlabeled data points comprises the identified closest data points.

9. The method of claim 1, wherein selecting the subset of unlabeled data points further comprises:

selecting from the current set of unlabeled data points a first intermediate subset of unlabeled data points using the classification results;

selecting from the first intermediate subset of unlabeled data points a second intermediate subset of unlabeled data points using a metadata parameter descriptive of the data points;

clustering the data points of the second intermediate subset of unlabeled data points using a first subset of attributes of the set of attributes, resulting in multiple clusters; and for each cluster of the multiple clusters identifying a closest data point to the centroid of the cluster, wherein the subset of unlabeled data points comprises the identified data points.

10. The method of claim 1, wherein selecting the subset of unlabeled data points further comprises:

selecting from the current set of unlabeled data points an intermediate subset of unlabeled data points using the classification results; and selecting from the intermediate subset of unlabeled data points the subset of unlabeled data points using a metadata parameter descriptive of the data points.

11. The method of claim 9, wherein the metadata parameter comprises at least one of:

a last modification time of the data point; or a user priority value of the data point.

12. The method of claim 1, further comprising:

clustering received data points using a second subset of attributes of the set of attributes, resulting in multiple clusters; and for each cluster of the multiple clusters identifying a closest data point to the centroid of the cluster, wherein the set of unlabeled data points comprises the identified data points.

13. The method of claim 12, wherein the second subset of attributes is one of:

the same as the first subset of attributes; and different from the first subset of attributes.

14. The method of claim 12, wherein the first subset of attributes is part of attributes of the second subset of attributes.

15. The method of claim 8, wherein receiving the labels of the subset of unlabeled data points further comprises receiving an indication of the first subset of attributes.

16. The method of claim 1, wherein selecting is performed using one of random sampling; margin sampling; entropy sampling; and disagreement sampling.

17. The method of claim 1, wherein selecting comprising ranking the data points and selecting the first ranked data points.

18. A computer program product comprising machine executable instructions for execution by a processor, wherein execution of the machine executable instructions causes the processor to perform a method, the method comprising:

training a machine learning model using a current set of labeled data points, each of the data points being multiple data records, wherein a label of a data point indicates a classification of the data point, the training resulting in a trained machine learning model that is configured to classify a data point as representing a same entity or different entities;

selecting from a current set of unlabeled data points a subset of unlabeled data points using classification results of classification of the current set of unlabeled data points using the trained machine learning model, the current set of unlabeled data points without the selected subset of unlabeled data points becoming the current set of unlabeled data points;

providing to a classifier the subset of unlabeled data points and in response to the providing, receiving labels of the subset of unlabeled data points;

repeating training, selecting, and providing using the subset of labeled data points in addition to the current set of labeled data points as the current set of labeled data points; and using the trained machine learning model to classify data points of the dataset, wherein:

training the machine learning model includes comparing a first set of attributes ranked by the classifier to a second set of attributes used by a probabilistic matching engine to train the machine learning model, in response to determining that the first set of attributes includes attributes not included in the second set of attributes, adding such attributes of the first set of attributes to the second set of attributes, and in response to determining that the second set of attributes includes all attributes included in the first set of attributes, using an initial training set of data points.

19. A computer system for matching data records of a dataset, the data records having values of a set of attributes, the computer system being configured to:

train a machine learning model using a current set of labeled data points, the data point being multiple data records, the training resulting in a trained machine learning model that is configured to classify a data point as representing a same entity or different entities;

select from a current set of unlabeled data points a subset of unlabeled data points using classification results of the set of unlabeled data points by the trained machine learning model, the current set of unlabeled data points without the selected subset of unlabeled data points becoming the current set of unlabeled data points;

provide to a classifier the subset of unlabeled data points and in response to the providing, receiving labels of the subset of unlabeled data points;

repeat training, selecting, and providing using the subset of labeled data points in addition to the current set of labeled data points as the current set of labeled data points; and use the trained machine learning model to classify data points of the dataset, wherein:

training the machine learning model includes comparing a first set of attributes ranked by the classifier to a second set of attributes used by a probabilistic matching engine to train the machine learning model, in response to determining that the first set of attributes includes attributes not included in the second set of attributes, adding such attributes of the first set of attributes to the second set of attributes, and in response to determining that the second set of attributes includes all attributes included in the first set of attributes, using an initial training set of data points.

20. A system comprising a processor configured to:

train a machine learning model using a current set of labeled data points, the data point being multiple data records, the training resulting in a trained machine learning model that is configured to classify a data point as representing a same entity or different entities;

select from a current set of unlabeled data points a subset of unlabeled data points using classification results of the set of unlabeled data points by the trained machine learning model, the current set of unlabeled data points without the selected subset of unlabeled data points becoming the current set of unlabeled data points;

provide to a classifier the subset of unlabeled data points and in response to the providing receiving labels of the subset of unlabeled data points; and repeat training, selecting, and providing using the subset of labeled data points in addition to the current set of labeled data points as the current set of labeled data points, wherein:

training the machine learning model includes comparing a first set of attributes ranked by the classifier to a second set of attributes used by a probabilistic matching engine to train the machine learning model, in response to determining that the first set of attributes includes attributes not included in the second set of attributes, adding such attributes of the first set of attributes to the second set of attributes, and in response to determining that the second set of attributes includes all attributes included in the first set of attributes, using an initial training set of data points.

* * * * *